US012694258B2

(12) United States Patent
Chiu

(10) Patent No.: US 12,694,258 B2
(45) Date of Patent: Jul. 28, 2026

(54) ACTIVE CHATBOT SYSTEM WITH CUSTOMIZED SETTING AND UPDATING DOWNLOAD AND METHOD THEREOF

(71) Applicants: SQ Technology (Shanghai) Corporation, Shanghai (CN); Inventec Corporation, Taipei City (TW)

(72) Inventor: Chuan-Cheng Chiu, Taipei City (TW)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 552 days.

(21) Appl. No.: 18/461,053

(22) Filed: Sep. 5, 2023

(65) Prior Publication Data

US 2024/0428043 A1 Dec. 26, 2024

(30) Foreign Application Priority Data

Jun. 25, 2023 (CN) .......................... 202310754977.1

(51) Int. Cl.
| | |
|---|---|
| *G06N 3/006* | (2023.01) |
| *G06N 3/0475* | (2023.01) |
| *G06N 3/0985* | (2023.01) |
| *G06F 8/65* | (2018.01) |
| *G06F 9/448* | (2018.01) |
| *G06F 16/242* | (2019.01) |
| *G06F 16/3329* | (2025.01) |

(52) U.S. Cl.
CPC ........... *G06N 3/006* (2013.01); *G06N 3/0475* (2023.01); *G06N 3/0985* (2023.01); *G06F*

8/65 (2013.01); *G06F 9/4498* (2018.02); *G06F 16/243* (2019.01); *G06F 16/3329* (2019.01)

(58) Field of Classification Search
None
See application file for complete search history.

(56) References Cited

U.S. PATENT DOCUMENTS

| | | | | |
|---|---|---|---|---|
| 11,106,874 | B2 * | 8/2021 | Roisman | ................. H04L 51/02 |
| 11,847,167 | B2 * | 12/2023 | Cappetta | ........... G06F 16/90332 |
| 11,990,123 | B1 * | 5/2024 | Rosser | ..................... G06F 40/56 |
| 12,493,637 | B2 * | 12/2025 | Chiu | ................... G06F 16/3329 |
| 12,511,282 | B1 * | 12/2025 | Ojha | ................. G06F 16/24522 |

(Continued)

*Primary Examiner* — Lashonda Jacobs-Burton
(74) *Attorney, Agent, or Firm* — David R. Stevens; Stevens Law Group

(57) ABSTRACT

An active chatbot system with customized setting and updating download and a method thereof are disclosed. In the active chatbot system, a rough question message having a natural language structure is generated based on a client behavior state and an customized parameter, and the rough question message is inputted to a logic circuit to generate a precise question message, and the precise question message is transmitted to an artificial intelligence platform to obtain a corresponding answer message which is used as first training data, the customization is used as second training data, the first training data and the second training data are inputted to an AI model to perform a training, weighting values of the AI model are translated to correspond to different customized parameter, a translating result is provided for the client-end host to download for customization setting and update. Therefore, the technical effect of improving convenience and specificity in model customization can be achieved.

10 Claims, 5 Drawing Sheets

(56)          References Cited

U.S. PATENT DOCUMENTS

| | | | |
|---|---|---|---|
| 2015/0045304 A1 * | 2/2015 | Beniash | C07K 14/47 |
| | | | 435/68.1 |
| 2020/0097067 A1 * | 3/2020 | Chou | A63F 13/42 |
| 2024/0394502 A1 * | 11/2024 | Sami | G06Q 20/227 |
| 2024/0394503 A1 * | 11/2024 | Gutierrez | G06N 20/00 |
| 2024/0412029 A1 * | 12/2024 | Yang | G06F 40/30 |
| 2024/0427809 A1 * | 12/2024 | Chiu | G06F 16/3329 |
| 2024/0428042 A1 * | 12/2024 | Chiu | G06N 3/006 |

* cited by examiner

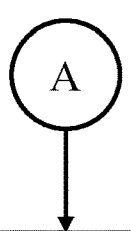

A

The AI platform inputs the precise question to a large language model (LLM) to generate the answer message, and transmits the answer message to the server-end host through the API

260

The server-end host receives the answer message corresponding to the precise question message from the AI platform, uses the answer message as first training data, uses the received customized parameter as second training data, inputs the first training data and the second training data into an AI model to perform a training, and obtains weighting values of the AI model after the training is completed

270

The server-end host translates the weighting values to correspond to different customized parameter and embeds a translating result into the state template of the update package for the client-end server to download

280

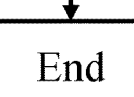

End

ACTIVE CHATBOT SYSTEM WITH CUSTOMIZED SETTING AND UPDATING DOWNLOAD AND METHOD THEREOF

CROSS-REFERENCE TO RELATED APPLICATION

This application claims the benefit of Chinese Application Serial No. 202310754977.1, filed Jun. 25, 2023, which is hereby incorporated herein by reference in its entirety.

BACKGROUND OF THE INVENTION

1. Field of the Invention

The present invention relates to a chatbot system and a method thereof, and more particularly to an active chatbot system with composite finite state machine, and a method thereof.

2. Description of the Related Art

In recent years, with the popularization and vigorous development of artificial intelligence (AI), various AI applications have sprung. Among the AI applications, chatbots attract the most attention.

Generally speaking, conventional chatbots based on artificial intelligence can use artificial intelligence models to output dialogues. However, general artificial intelligence models can only simply answer users' questions in a standard way, so there are problems of dull dialogues and insufficient simulation, and it greatly reduces the user's willingness to talk to the chatbot. On the other hand, since the answering method is treated equally for all users and also lacks specificity, there may be a problem of not being speculative for different users.

For the above-mentioned reason, some manufacturers have proposed a technical solution of training artificial intelligence models to make their answers emotional. For example, when generating an answer, the proposed technical solution embeds emotional words or sentences according to the answer. The proposed technical solution can make the answer no longer dull, but it is also unable to generate exclusive dialogues, that is to say, there will be no different dialogues for different users, so it still cannot effectively solve the problem of poor convenience in model customization and non-obvious specificity. On the other hand, if the artificial intelligence model is to be customized and trained, the server-end host needs a large amount of computing power, which is also a problem to be solved.

Therefore, what is needed is to develop an improved solution to solve the problems of convenience and non-obvious specificity in model customization and a heavy load in computing power of the server-end host.

SUMMARY OF THE INVENTION

An objective of the present invention is to disclose an active chatbot system with customized setting and updating download and a method thereof, to solve the conventional problem.

In order to achieve the objective, the present invention provides an active chatbot system with customized setting and updating download, includes an artificial intelligence platform, a client-end host, and a server-end host. The artificial intelligence platform is configured to receive a precise question message through an application programming interface (API) and input the precise question message to a large language model to generate an answer message, and transmit the answer message through the application programming interface. The client-end host includes at least one sensor, a first non-transitory computer readable storage medium, and a first hardware processor. The at least one sensor is configured to continuously sense at least one of a physiological state, a facial expression and a body movement, to generate a client behavior state. The first non-transitory computer readable storage medium is configured to store a plurality of first computer readable instructions. The first hardware processor is electrically connected to the first non-transitory computer readable storage medium and the at least one sensor, and configured to execute the plurality of first computer readable instructions to make the client-end host download an update package and continuously transmit the client behavior state and at least one customized parameter, wherein the update package comprises a state template to set and update the at least one customized parameter.

The server-end host is connected to the client-end host and configured to receive the client behavior state and the at least one customized parameter. The server-end host includes a logic circuit, a second non-transitory computer readable storage medium, and a second hardware processor. The logic circuit includes a first finite state machine and a second finite state machine connected in series, wherein the first finite state machine receives a rough question message and the answer message, an output of the first finite state machine is used as an input of the second finite state machine, and the second finite state machine generates the precise question message and outputs the precise question message to the artificial intelligence platform through the application programming interface. The second non-transitory computer readable storage medium is configured to store a plurality of second computer readable instructions. The second hardware processor is electrically connected to the second non-transitory computer readable storage medium and the logic circuit, and configured to execute the plurality of second computer readable instructions to make the server-end host execute: generating a rough question message having a natural language structure based on the received client behavior state and the at least one customized parameter, and inputting the rough question message to the logic circuit; after the logic circuit generate the precise question message based on the rough question message and inputs the precise question message to the artificial intelligence platform, receiving the answer message corresponding to the precise question message as first training data from the artificial intelligence platform; using the at least one customized parameter as second training data, and inputting the first training data and the second training data to an artificial intelligence model for performing a training, and obtaining weighting values of the artificial intelligence model after the training is completed; translating the weighting values to correspond to the different? customized parameter, and embedding a translating result into the state template of the update package for providing the client-end host to download.

In order to achieve the objective, the present invention discloses an active chatbot method with customized setting and updating download, and the active chatbot method includes steps of: connecting a server-end host to an artificial intelligence (AI) platform and a client-end host; continuously sensing at least one of a physiological state, a facial expression and a body movement to generate a client behavior state through a sensor, by the client-end host;

downloading an update package, by the client-end host, wherein the update package comprises a state template to set and update at least one customized parameter; transmitting the user behavior state and the customized parameters to the server-end host from the client-end host, continuously; generating a rough question message having a natural language structure based on the received client behavior state and the at least one customized parameter, and inputting the rough question message to a first finite state machine and a second finite state machine connected in series to perform parsing, and transiting states of the first finite state machine and the second finite state machine to generate a precise question message, by the server-end host, wherein the first finite state machine receives the rough question message and an answer message from the AI platform, an output of the first finite state machine is inputted to the second finite state machine, the second finite state machine outputs the precise question to the AI platform through an application programming interface (API) of the AI platform; inputting the precise question message to the large language model to generate the answer message, and transmitting the answer message to the server-end host through the application programming interface, by the artificial intelligence platform; receiving the answer message corresponding to the precise question message as first training data from the artificial intelligence platform, and using the received at least one customized parameter as second training data, inputting the second training data and the first training data to an artificial intelligence for performing a training, and obtaining weighting values of the AI model after the training is completed, by the server-end host; translating the weighting values to correspond to different? Customized parameter and embedding a translating result to the state template of the update package for providing the client-end host to download, by the server-end host.

According to the above-mentioned system and method of the present invention, the difference between the conventional technology and the present invention is that in the present invention the rough question message having the natural language structure is generated based on the client behavior state and the customized parameter, and the rough question message is inputted to the logic circuit to generate the precise question message, and the precise question message is transmitted to the artificial intelligence platform to obtain the corresponding answer message which is used as the first training data, the customized parameter is used as the second training data, the first training data and the second training data are inputted to the AI model to perform the training, the weighting values of the AI model are translated to correspond to different customized parameter after the training is completed, the translating result is provided for the client-end host to download for customization setting and update.

Therefore, the technical solution of the present invention is able to achieve the technical effect of improving convenience in model customization and specificity.

BRIEF DESCRIPTION OF THE DRAWINGS

The structure, operating principle and effects of the present invention will be described in detail by way of various embodiments which are illustrated in the accompanying drawings.

FIGS. 2A and 2B are flowcharts of an active chatbot method with customized setting and updating download, according to the present invention.

DETAILED DESCRIPTION OF THE PREFERRED EMBODIMENTS

Figure 1:
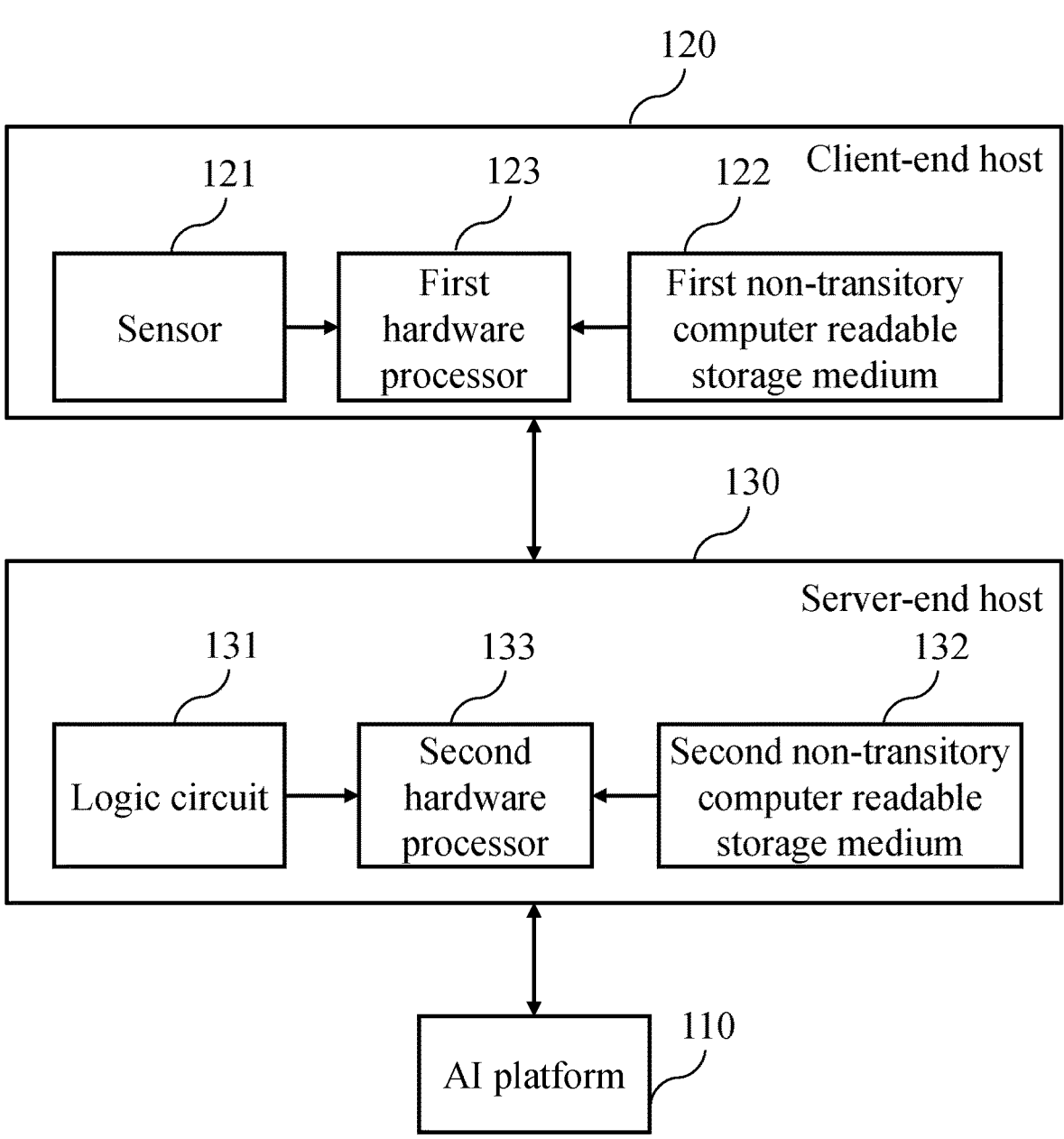
FIG. 1 is a block diagram of an active chatbot system with customized setting and updating download, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a block diagram of an active chatbot system with customized setting and updating download, according to the present invention. As shown in FIG. 1, the active chatbot system includes an artificial intelligence platform 110, a client-end host 120, and a server-end host 130. The artificial intelligence platform 110 is configured to receive a precise question message through an application programming interface (API), and input the precise question message to a large language model (LLM)

to generate an answer message, and transmit the answer message to the server-end host 130 through the application programming interface. In actual implementation, the artificial intelligence platform 110 uses a chatbot using a large language model, and the large language model can be, for example, generative pre-trained transformer, (GPT), paLM, Galactica, LLaMA, LaMDA or the like.

The client-end host 120 includes a sensor 121, a first non-transitory computer readable storage medium 122, and a first hardware processor 123. The sensor 121 is configured to continuously sense at least one of a physiological state, a facial expression and a body movement, to generate a client behavior state. In actual implementation, the sensor 121 senses physiological feature such as blood pressure, heartbeat, pulse, blood sugar, to determine the physiological state such as happy, excited, or depressed; in an embodiment, the sensor 121 can be used to determine a facial expression and mood by sensing human face and iris; in an embodiment, a sensor (such as a three-axis acceleration sensor or a gyroscope) worn on the limbs of the human body can be used to sense the user's body movement, such as walking, running, dancing and so on.

The first non-transitory computer readable storage medium 122 is configured to store a plurality of first computer readable instructions. In actual implementation, the first non-transitory computer readable storage medium 122 includes a hard disk, an optical disk, a flash memory or the like. In addition, the first computer readable instruction means an instruction which can be interpreted and executed by the client-end host 120 (such as a computer in client-end device).

The first hardware processor 123 is electrically connected to the first non-transitory computer readable storage medium 122 and the sensor 121, and configured to execute the plurality of first computer readable instructions to make the client-end host 120 download an update package and continuously transmit the client behavior state. The update package includes a state template to set and update the customized parameter. In actual implementation, the customized parameter can include a time message and a filtering parameter. The time message can include for example, year, month, day, hours, minutes, seconds, and even time intervals, and can be used as a basis of determining the answer message associated with time, for example, the time message can be used for determining whether the answer message is expired, setting periodic feedback (for example, sending an on-demand conversation message reminding you to eat at 12 am every day), or other time-related situations; for example, the time in the morning is associated with breakfast, the period from 0:00 am to 4:00 am is associated with sleep, and national holidays are associated with fixed dates, a birthday is associated with a specified date, etc. Therefore, when the time falls within the morning scope, the answer message related to breakfast is filtered out; when the time is within between 0:00 am and 4:00 am, the answer message related to sleep is filtered out; when the time is a national holiday, the answer message containing this national holiday is filtered out. In addition, the filtering parameter can be used, for example, to set the answer message which is permitted to receive, and the answer message which is rejected to receive; in other words, the user can be set the filtering parameter according to his preference, for example, the filtering parameter can be set to filter out chat content containing politics and religion, or only receive entertainment chat content, or filter out the content with frustration statement.

The server-end host 130 is connected to the client-end host 120 and configured to receive the client behavior state and the customized parameter. The server-end host 130 includes a logic circuit 131, a second non-transitory computer readable storage medium 132, and a second hardware processor 133. The logic circuit 131 includes a first finite state machine and a second finite state machine which are connected in series. The first finite state machine receives a rough question message and the answer message, an output of the first finite state machine is used as an input of the second finite state machine, and the second finite state machine generates a precise question message and outputs the precise question message to the artificial intelligence platform 110 through the application programming interface. In an embodiment, for example, the first finite state machine can be a Mealy-machine finite state machine, and an output of the first finite state machine is affected by a current stare, the rough question message and the answer message; the second finite state machine can be a Moore-machine finite state machine, and an output of the second finite state machine is affected by a current state. In practice, each customized parameter can be transited into a state table first, a flip-flop transition table is then set based on a flip-flop excitation table, and a Karnaugh map can be used to obtain an input equation of each flip-flop, so as to generate the circuit of the finite state machine, thereby realizing the logic circuit 131.

The second non-transitory computer readable storage medium 132 is configured to store a plurality of second computer readable instructions. In actual implementation, the difference between the second non-transitory computer readable storage medium 132 and the first non-transitory computer readable storage medium 122 is that the second non-transitory computer readable storage medium 132 is a non-transitory computer readable storage medium of the server-end host 130 for storing the computer readable instruction (that is, second computer readable instruction) executed by the server-end host 130, and the first non-transitory computer readable storage medium 122 is the non-transitory computer readable storage medium of the client-end host 120 for storing the computer readable instruction (that is, the first computer readable instruction) executed by the client-end host 120.

The second hardware processor 133 is electrically connected to the second non-transitory computer readable storage medium 132 and the logic circuit 131, and configured to execute the plurality of second computer readable instructions to make the server-end host 130 execute: generating a rough question message having a natural language structure based on the received client behavior state and the at least one customized parameter, and inputting the rough question message to the logic circuit 131; after the logic circuit 131 generates the precise question message based on the rough question message and inputs the precise question message to the artificial intelligence platform 110, receiving the answer message corresponding to the precise question message as first training data from the artificial intelligence platform 110; using the customized parameter as second training data, and inputting the second training data and the first training data into an AI model to perform a training, and obtaining weighting values of the AI model after the training is completed; translating the weighting values to correspond to different customized parameter and embedding the translating result into the state template of the update package for the client-end host 120 to download. For example, in a condition that the client behavior state received by the server-end host 130 is "excited" and the customized parameter includes a time message "AM 08:00" and the filtering parameter is "excluding frustration statement", the second hardware processor 133 generates the rough question message such as "excited, AM 08:00 and excluding frustration statement" based on the terms "excited", "AM 08:00" and "excluding frustration statement". Next, the rough question message is inputted to finite state machines of the logic circuit 131 to perform parsing, and the states of the finite state machines are transited. For example, a type of the question is defined based on "excited", a specific time state of the question is defined based on "AM 08:00", a scope of the question is defined based on "excluding frustration statement", and then a precise question message is generated according to a pre-defined template or a syntax rule, for example, "please list five reasons to make you be excited and not depressed at 8 o'clock in the morning", or "it is 8:00 in the morning, I am excited, any suggestions?". Next, the precise question message is transmitted to the artificial intelligence platform 110 to obtain the corresponding answer message, the answer message is inputted to the logic circuit 131 to automatically identify the association between the question and the answer, thereby dynamically adjusting the state setting of the finite state machines to make the question more precise. For example, less relevant question is automatically set to be replayed by more relevant question, so as to generate the precise question message. Furthermore, the answer message is also used as the first training data, the customized parameter is used as the second training data, the first training data and the second training data are inputted to the AI model to perform a training, weighting values of the AI model are obtained after the training is completed. The second hardware processor 133 translates the weighting values to correspond to different customized parameter, and embeds a translating result into the state template of the update package for the client-end host 130 to download. For example, for translation, explanatory techniques such as local interpretable model-agnostic explanations (LIME), or Shapley additive explanations (SHAP) can be used to obtain effects of the weighting values in specific instances, and these effects can be translated into human-understandable explanations or parameters, for example, when the data output by the AI model is affected by certain keywords of customized parameters, the weighting values are set to correspond to the certain keywords and embedded in the state template, in this way, from the state template, so that the user can easily understand which customized parameter has a more effect on the output of the artificial intelligence model, and which customized parameters have a lesser effect, thereby controlling the customized parameters based on the effect levels, for example, to avoid using a customized parameter with less effect.

It is to be particularly noted that, in actual implementation, the present invention can be implemented fully or partly based on hardware, for example, one or more module of the system can be implemented by integrated circuit chip, system on chip (SOC), a complex programmable logic device (CPLD), or a field programmable gate array (FPGA). The non-transitory computer readable storage medium of the present invention records computer readable program instructions, and the processor can execute the computer readable program instructions to implement concepts of the present invention. The non-transitory computer-readable storage medium can be a tangible apparatus for holding and storing the instructions executable of an instruction executing apparatus. The non-transitory computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in non-transitory computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language.

Figure 2A:
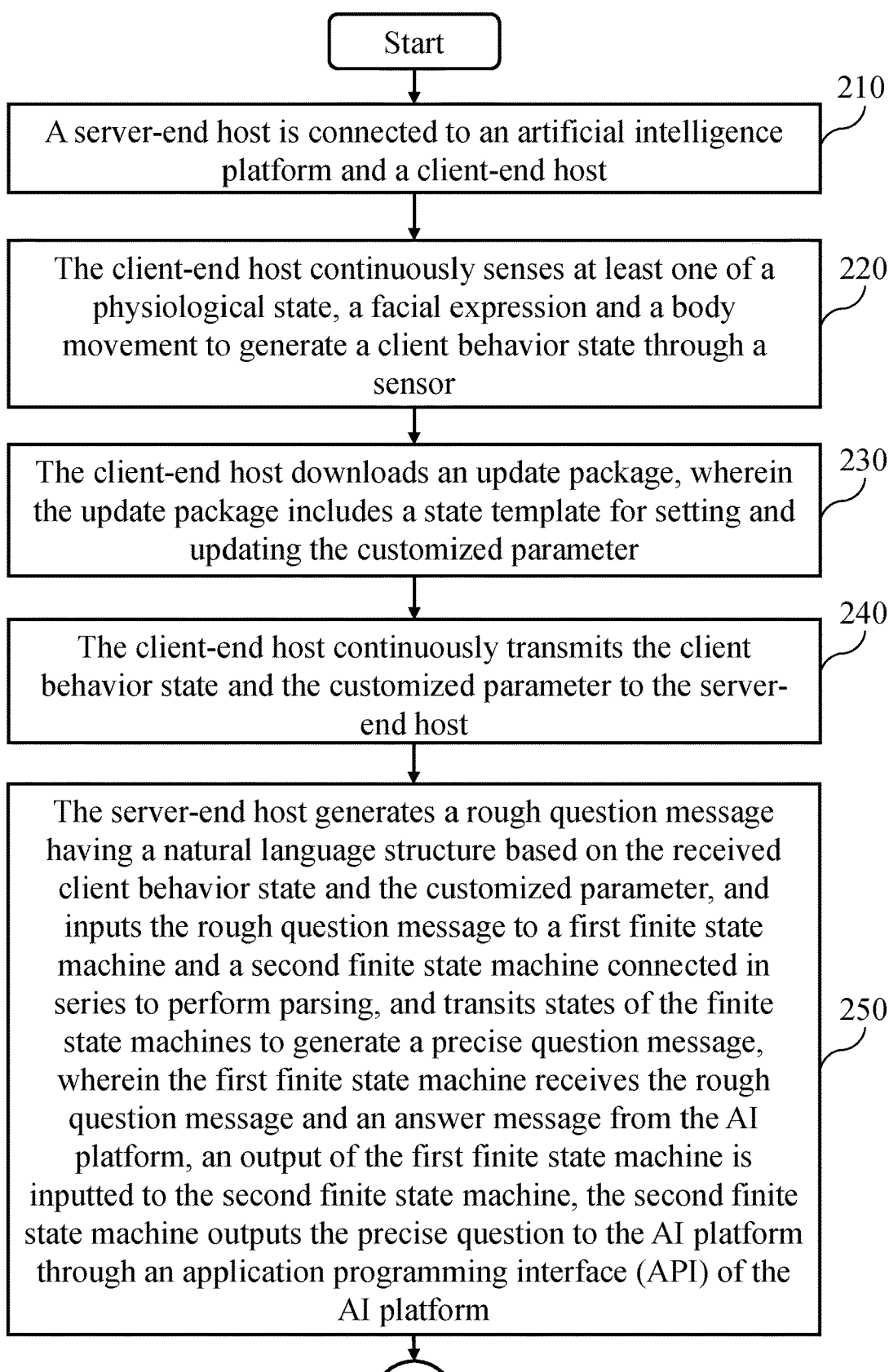

Please refer to FIG. 2A and FIG. 2B, which are flowcharts of an active chatbot method with customized setting and updating download, according to the present invention. As shown in FIG. 2A and FIG. 2B, the active chatbot method includes the following steps. In a step 210, a server-end host 130 is connected to an artificial intelligence platform 110 and a client-end host 120. In a step 220, the client-end host 120 continuously senses at least one of a physiological state, a facial expression and a body movement to generate a client behavior state through a sensor 121. In a step 230, the client-end host 120 downloads an update package, wherein the update package includes a state template for setting and updating the customized parameter. In a step 240, the client-end host 120 continuously transmits the client behavior state and the customized parameter to the server-end host 130. In a step 250, the server-end host 130 generates a rough question message having a natural language structure based on the received client behavior state and the customized parameter, and inputs the rough question message to a first finite state machine and a second finite state machine connected in series to perform parsing, and transits states of the finite state machines to generate a precise question message, wherein the first finite state machine receives the rough question message and an answer message from the AI platform 110, an output of the first finite state machine is inputted to the second finite state machine, the second finite state machine outputs the precise question to the AI platform 110 through an application programming interface (API) of the AI platform 110. In a step 260, the AI platform 110 inputs the precise question to a large language model (LLM) to generate the answer message, and transmits the answer message to the server-end host 130 through the API. In a step 270, the server-end host 130 receives the answer message corresponding to the precise question message from the AI platform, uses the answer message as first training data, uses the received customized parameter as second training data, inputs the first training data and the second training data into an AI model to perform a training, and obtains weighting values of the AI model after the training is completed. In a step 280, the server-end host 130 translates the weighting values to correspond to different customized parameter and embeds a translating result into the state template of the update package for the client-end server 120 to download. Through aforementioned steps, the rough question message having a natural language structure can be generated based on the client behavior state and the customized parameter, and the rough question message is inputted to the logic circuit to generate the precise question message, and the precise question message is transmitted to the artificial intelligence platform 110 to obtain a corresponding answer message which is used as the first training data, the customization parameter is used as the second training data, the first training data and the second training data are inputted to the AI model to perform a training, the weighting values of the AI model are translated to correspond to different customized parameter, and the translating result is provided for the client-end host 120 to download for customization setting and update.

Figure 3:
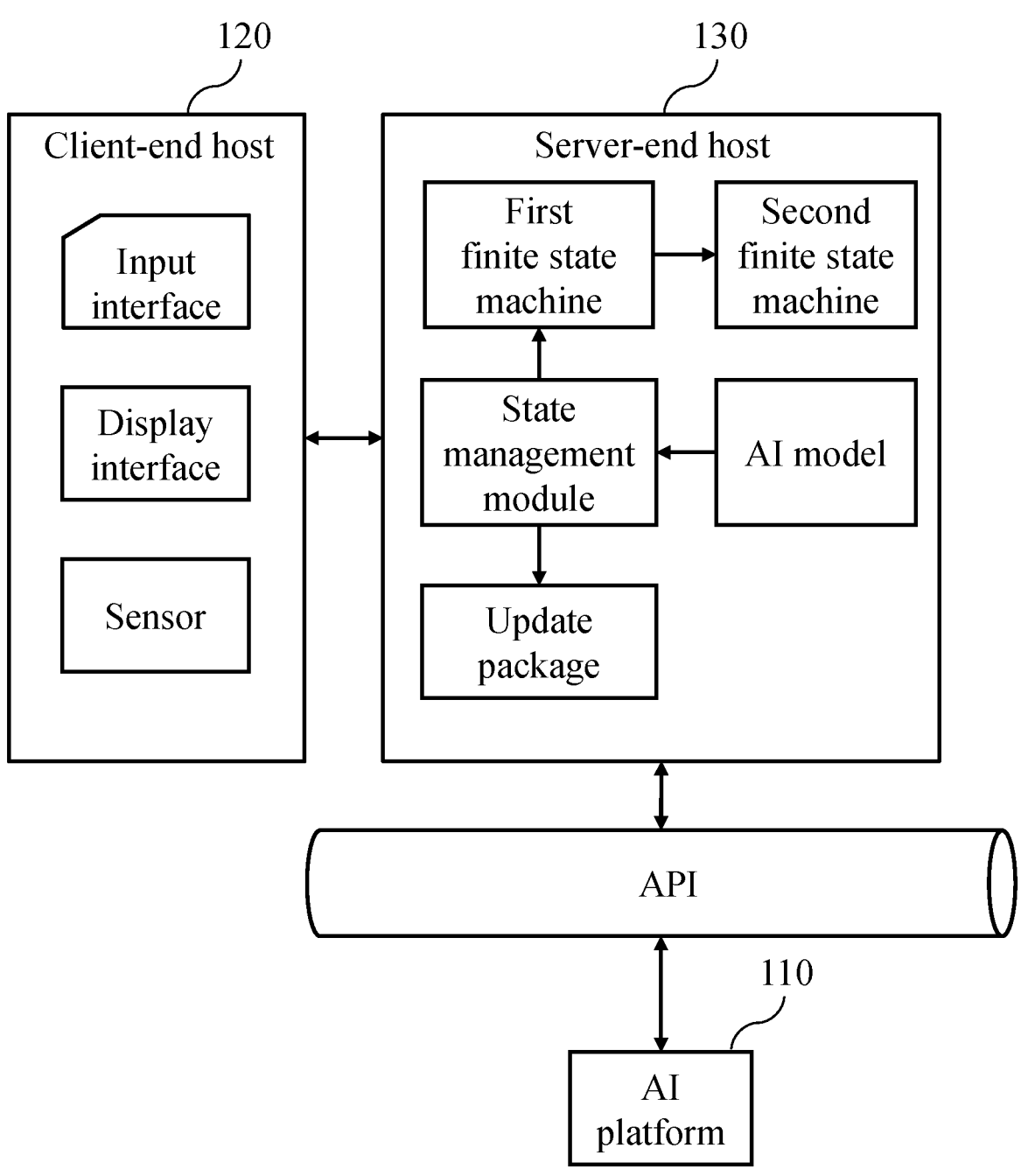
FIG. 3 is a schematic view of a client-end host, a server-end host and an AI platform of the present invention.

The embodiment of the present invention is described in the following paragraphs with reference to FIG. 3 and FIG. 4. Please refer to FIG. 3, which is a schematic view of a client-end host, a server-end host and an AI platform of the present invention. The server-end host 130 is connected to the artificial intelligence platform 110 and the client-end host 120. The client-end host 120 continuously senses at least one of a user's physiological state, facial expression and body movement to generate a client behavior state, and downloads an update package. The update package includes a state template for setting and updating customized parameters. The client-end host 120 continuously transmits the client behavior state and the customized parameters to the server-end host 130 through an input interface. A state management module of the server-end host 130 generates the rough question message having a natural language structure based on the received client behavior state and the customized parameters, and inputs the generated rough question message to a first finite state machine (such as Mealy-machine finite state machine) and a second finite state machine (such as Moore-machine finite state machine) to perform parsing and transit the states of the first finite state machine and the second finite state machine, so as to generate the precise question message. The first finite state machine and the second finite state machine are connected in series. Next, the precise question message is transmitted to the artificial intelligence platform 110 through the API of the artificial intelligence platform 110. The artificial intelligence platform 110 inputs the precise question message to a large language model to generate an answer message, and transmits the answer message to the server-end host 130 through the API. After the server-end host 130 receives the answer message corresponding to the precise question message from the artificial intelligence platform 110, the server-end host 130 inputs the answer to the first finite state machine to check the association between the question and the answer to further optimize the rough question message to the precise question message. Besides, the server-end host

130 uses the received answer message as first training data, uses the received customized parameter as second training data, inputs the first and second training data to the AI model to perform a training, obtains weighting values of the AI model after the training is completed, translates the weighting values to correspond to different customized parameter, and embedding a translating result into the state template of the update package for providing the client-end host 120 to download. In this way, the client-end host 120 can obtain the customized weighting value of the AI model, and even the AI model is reset or initialized, the user can upload the customized parameters and the weighting values to the server-end host 130 through the state template, to update and set the AI model. Therefore, without re-training, the AI model can output a result the same as the result of the previously-trained AI model. Particularly, it should be noted that the state management module and the AI model are implemented by executing computer readable instruction by the hardware processor. In actual implementation, the AI model is trained with an artificial intelligence (AI) neural network such as convolutional neural networks (CNN), recurrent neural networks (RNN), long short-term memory (LSTM), transformer, or the like. In addition, methods such as backpropagation algorithm and gradient descent can also be used for optimization during the training process.

Figure 4:
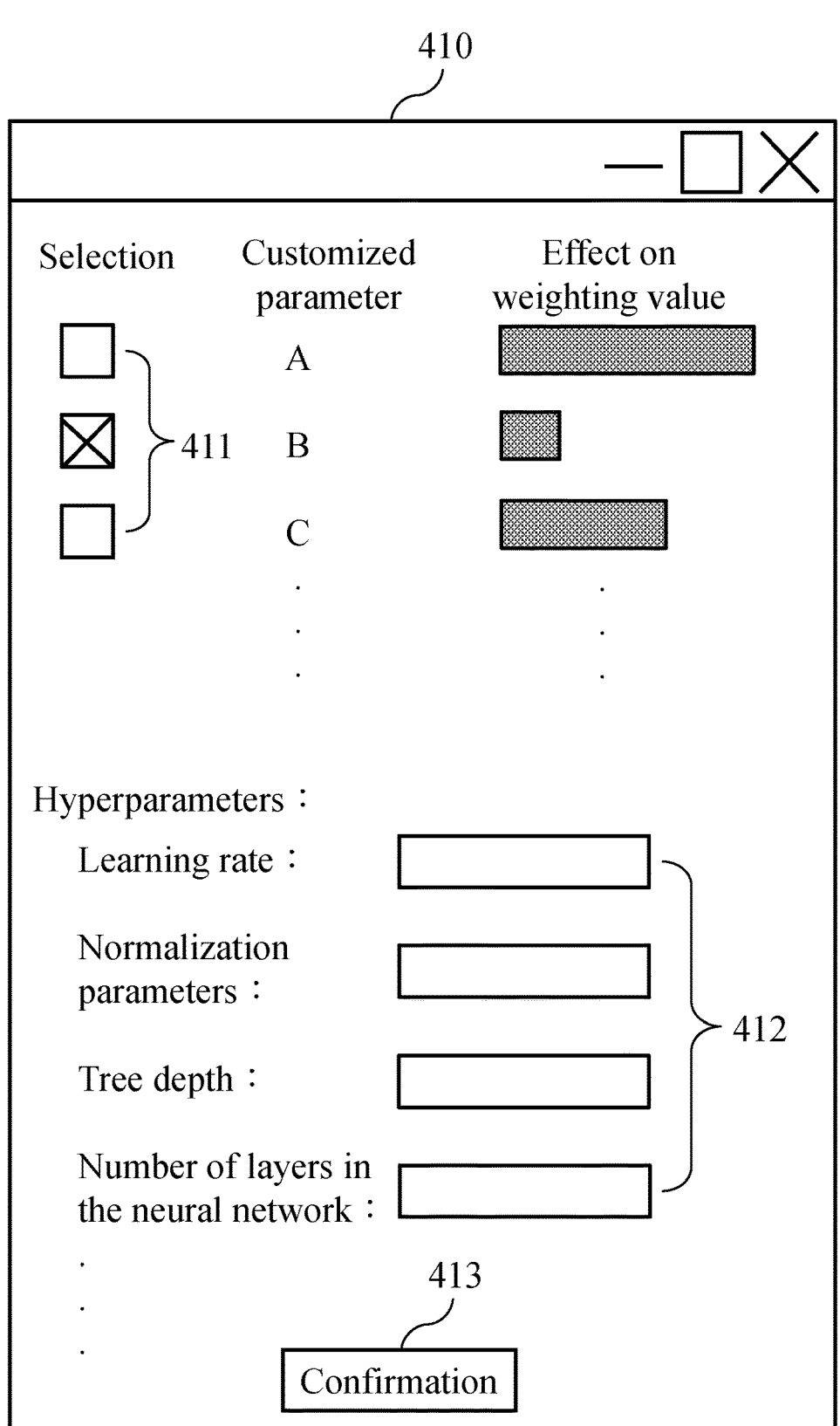
FIG. 4 is a schematic view of setting and updating customized parameter through a state template, according to the present invention.

As shown in FIG. 4, which is a schematic view of setting and updating a customized parameter through a state template, according to the present invention. In actual implementation, after the client host 120 downloads an update package from the server-end host 130, the client-end host 120 can view the state template provided by the update package through a setting window 410. As shown in FIG. 4, the setting window 410 can display the customized parameters and their effects on the weighting values. For example, in a condition that the effects are shown in a bar chart, a longer bar means a greater effect, and a shorter bar means a less effect. In this example shown in FIG. 4, the customized parameter "A" has a greater effect on the weighting values than the customized parameter "C", and the customized parameter "C" has a greater effect on the weighting value than the customized parameter "B". That is to say, the user can choose to delete the customized parameter "B" which has the least effect on the output result of the artificial intelligence model through a filter component 411. After deleting the customized parameter "B", the user can click a confirmation component 413 to save the setting. In actual implementation, it should be noted that, in addition to setting and updating of the customized parameters, the state template can also be used for setting and updating of hyperparameters; the hyperparameters usually determines the structure of AI model and various details of the training process, such as learning rate, normalization parameters, tree depth, number of layers in the neural network, etc. The user can perform the above-mentioned setting process through an input block 412, and after the setting process is completed, the client-end host 120 can upload the setting to the server-end host 130, so that the server-end host 130 can directly apply the weighting values corresponding to the customized parameters (or hyperparameters) to the AI model based on the setting of the state template. In other words, after the update package is set, the AI model can be customized as the AI model exclusive for the client-end host 120 without training. Furthermore, because the generation of these weighting values is affected by the user behavior state and the customized parameters of the client host 120 (for example, the first training data is affected by the user behavior state and the customized parameters, and the second training data is the customized parameters), these weighting values are specific to the client-end host 120, and the artificial intelligence model applying these weighting values is very suitable for the client-end host 120. Moreover, the update package is set by extracting the weighting values trained by the transmitted customized parameters and the user behavior state previously sensed by the client host 120, by the server host 130, so that the computing power load of the server-end host 130 for training model can be effectively reduced.

According to the above-mentioned system and method of the present invention, the difference between the present invention and the conventional technology is that in the present in the present invention the rough question message having the natural language structure is generated based on the client behavior state and the customized parameter, and the rough question message is inputted to the logic circuit to generate the precise question message, and the precise question message is transmitted to the artificial intelligence platform to obtain the corresponding answer message which is used as the first training data, the customization is used as the second training data, the first training data and the second training data are inputted to the AI model to perform the training, the weighting values of the AI model are translated to correspond to different customized parameter after the training is completed, the translating result is provided for the client-end host to download for customization setting and update. Therefore, the technical solution of the present invention is able to solve the conventional problem, and achieve the technical effect of improving convenience and specificity in model customization.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An active chatbot system with customized setting and updating download, comprising:

an artificial intelligence platform configured to receive a precise question message through an application programming interface (API) and input the precise question message to a large language model to generate an answer message, and transmit the answer message through the application programming interface;

a client-end host, comprising:

at least one sensor configured to continuously sense at least one of a physiological state, a facial expression and a body movement, to generate a client behavior state;

a first non-transitory computer readable storage medium configured to store a plurality of first computer readable instructions; and a first hardware processor, electrically connected to the first non-transitory computer readable storage medium and the at least one sensor, and configured to execute the plurality of first computer readable instructions to make the client-end host download an update package and continuously transmit the client behavior state and at least one customized parameter, wherein the update package comprises a state template to set and update the at least one customized parameter; and a server-end host, connected to the client-end host and configured to receive the client behavior state and the at least one customized parameter, wherein the server-end host comprises:

a logic circuit, comprising a first finite state machine and a second finite state machine connected in series, wherein the first finite state machine receives a rough question message and the answer message, an output of the first finite state machine is used as an input of the second finite state machine, and the second finite state machine generates the precise question message and outputs the precise question message to the artificial intelligence platform through the application programming interface;

a second non-transitory computer readable storage medium configured to store a plurality of second computer readable instructions; and a second hardware processor, electrically connected to the second non-transitory computer readable storage medium and the logic circuit, and configured to execute the plurality of second computer readable instructions to make the server-end host execute:

generating a rough question message having a natural language structure based on the received client behavior state and the at least one customized parameter, and inputting the rough question message to the logic circuit;

after the logic circuit generates the precise question message based on the rough question message and inputs the precise question message to the artificial intelligence platform, receiving the answer message corresponding to the precise question message as first training data from the artificial intelligence platform;

using the at least one customized parameter as second training data, and inputting the first training data and the second training data to an artificial intelligence model for performing a training, and obtaining weighting values of the artificial intelligence model after the training is completed; and translating the weighting values to correspond to the different customized parameters, and embedding a translating result into the state template of the update package for providing the client-end host to download.

2. The active chatbot system with customized setting and updating download according to claim 1, wherein the server-end host selects at least one of a natural language processing (NLP), a generative model and a template matching to generate the rough question message having the natural language structure.

3. The active chatbot system with customized setting and updating download according to claim 1, wherein the first finite state machine and the second finite state machine perform parsing on the rough question message to generate a key word and a syntax structure, and transit the states thereof to determine a question type based on a parsing result, and use a pre-defined template or a syntax rule to generate the precise question message which is more specific and clearer than the rough question message.

4. The active chatbot system with customized setting and updating download according to claim 1, wherein the first finite state machine is a Mealy-machine finite state machine, and the output of the first finite state machine is affected by a current stare, the rough question message and the answer message, wherein the second finite state machine is a Moore-machine finite state machine, and an output of the second finite state machine is affected by a current state.

5. The active chatbot system with customized setting and updating download according to claim 1, wherein the customization parameter comprises a filtering parameter and a time message, the filtering parameter is configured to set the answer message which is permitted to receive, and the answer message which is rejected to receive, wherein the time message is used as a basis of determining the answer message associated with time.

6. An active chatbot method with customized setting and updating download, comprising:

connecting a server-end host to an artificial intelligence (AI) platform and a client-end host;

continuously sensing at least one of a physiological state, a facial expression and a body movement to generate a client behavior state through a sensor, by the client-end host;

downloading an update package, by the client-end host, wherein the update package comprises a state template to set and update at least one customized parameter;

transmitting the user behavior state and the customized parameters to the server-end host from the client-end host, continuously;

generating a rough question message having a natural language structure based on the received client behavior state and the at least one customized parameter, and inputting the rough question message to a first finite state machine and a second finite state machine connected in series to perform parsing, and transiting states of the first finite state machine and the second finite state machine to generate a precise question message, by the server-end host, wherein the first finite state machine receives the rough question message and an answer message from the AI platform, an output of the first finite state machine is inputted to the second finite state machine, the second finite state machine outputs the precise question to the AI platform through an application programming interface (API) of the AI platform;

inputting the precise question message to the large language model to generate the answer message, and transmitting the answer message to the server-end host through the application programming interface, by the artificial intelligence platform;

receiving the answer message corresponding to the precise question message as first training data from the artificial intelligence platform, and using the received at least one customized parameter as second training data, inputting the second training data and the first training data to an artificial intelligence for performing a training, and obtaining weighting values of the AI model after the training is completed, by the server-end host; and translating the weighting values to correspond to different customized parameters and embedding a translating result to the state template of the update package for providing the client-end host to download, by the server-end host.

7. The active chatbot method with customized setting and updating download according to claim 6, wherein the server-end host selects at least one of a natural language processing (NLP), a generative model and a template matching to generate the rough question message having the natural language structure.

8. The active chatbot method with customized setting and updating download according to claim 6, wherein the first finite state machine and the second finite state machine perform parsing on the rough question message to generate a key word and a syntax structure, and transit states thereof to determine a question type based on a parsing result, and a pre-defined template or a syntax rule is used to generate the precise question message which is more specific and clearer than the rough question message.

9. The active chatbot method with customized setting and updating download according to claim 6, wherein the first finite state machine is a Mealy-machine finite state machine, and the output of the first finite state machine is affected by a current stare, the rough question message and the answer message, wherein the second finite state machine is a Moore-machine finite state machine, and an output of the second finite state machine is affected by a current state.

10. The active chatbot method with customized setting and updating download according to claim 6, wherein the at least one customized parameter comprises a filtering parameter and a time message, the filtering parameter is configured to set the answer message which is permitted to receive, and the answer message which is rejected to receive, wherein the time message is used as a basis of determining the answer message associated with time.

* * * * *